(No Model.)

F. E. FRENCH.
SHEARS.

No. 338,346. Patented Mar. 23, 1886.

Witnesses:
Walter E. Lombard
Geo. E. Mitchell

Inventor:
Frank E. French,
by N. C. Lombard
Attorney.

UNITED STATES PATENT OFFICE.

FRANK E. FRENCH, OF LACONIA, NEW HAMPSHIRE.

SHEARS.

SPECIFICATION forming part of Letters Patent No. 338,346, dated March 23, 1886.

Application filed October 21, 1885. Serial No. 180,507. (No model.)

*To all whom it may concern:*

Be it known that I, FRANK E. FRENCH, of Laconia, in the county of Belknap and State of New Hampshire, have invented a new and useful Improvement in Shears, of which the following, taken in connection with the accompanying drawings, is a specification.

My invention relates to that class of shears which have two blades pivoted together, and arranged to be operated by vibrating one or both of said blades about said pivot; and it consists in forming upon or securing to one of said blades a hollow boss or hub inclosing a spring, in combination with a screw-pivot passing through both blades and said spring, and a non-revoluble nut upon the end of said screw-pivot, constructed and arranged to compress said spring between it and the blade of the shear, and to be adjusted for increasing or diminishing the tension of said spring, whereby the blades of the shears are rendered self-adjusting relative to each other, and take any slack occasioned by wear of the pivotal connection, as will be hereinafter more fully described.

Figure 1:
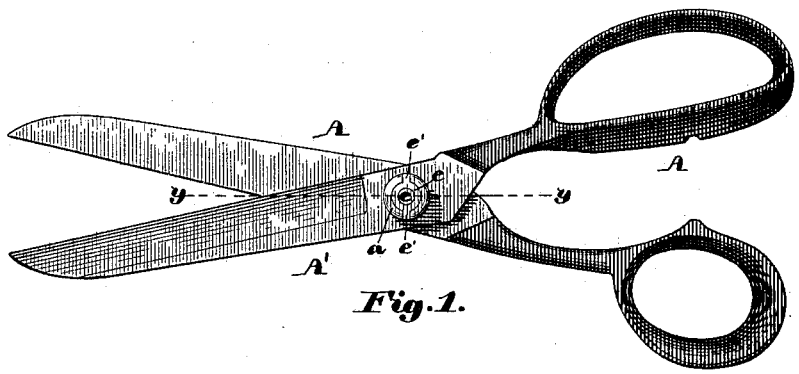
Figure 2:
Figure 3:
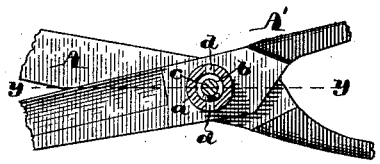
Figure 4:
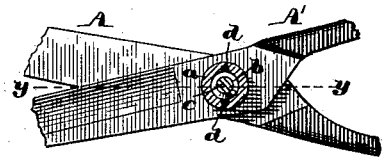
Figure 5:
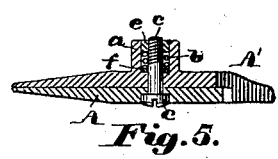

Figure 1 of the drawings is a plan of a pair of shears illustrating my invention. Fig. 2 is an edge view of so much thereof as is necessary to illustrate my invention. Figs. 3 and 4 are sectional plans, the cutting planes being on line $x\,x$ on Fig. 2, showing two forms of constructing the hollow hub; and Fig. 5 is a section on line $y\,y$ on Figs. 1 and 3.

In the drawings, A and A' are the two blades of the shears, each provided with a bow to receive a thumb or finger of the operator's hand, as shown. The blade A' has formed thereon or secured thereto by brazing or soldering the hollow hub $a$, the inner diameter of which is sufficiently large to receive the coiled spring $b$ between its walls and the screw-pivot $c$. The hub $a$ is shown as provided with two slots, $d$, cut through its wall, to receive projections $e'$ on the nut $e$, which is fitted to the bore of the hub $a$, and into which the pivot-pin $c$ is screwed, as shown.

The object of the slots $d$ and the projections $e'$ is to prevent the nut $e$ turning when the screw pivot-pin $c$ is screwed in or out, and hence it is obvious that any other form of nut and corresponding construction of the interior of the hub $a$ that will prevent such turning of the nut and at the same time permit it to move freely toward or from the shear-blade whenever the pivot pin is turned will produce the same result as the precise construction shown—as, for instance, one of the slots and one of the projections might be dispensed with, or the slots might be only grooves formed in the interior surface of the hub $a$, as shown in Fig. 4.

Between the inner end of the spring and the bottom of the chamber in the hub $a$ is placed a washer, $f$, which may be separate from the spring, as shown, or it may be soldered thereto, the object being to produce a smooth annular surface to bear upon the shoulder at the bottom of said chamber, instead of having the end of the spring bear directly upon said shoulder.

What I claim as new, and desire to secure by Letters Patent of the United States, is—

1. As a means of securing the blades of a pair of shears together, a chambered hub on one of said blades, in combination with a screw pivot-pin, a spring inclosed in said chambered hub and surrounding said screw-pin, and a non-revoluble nut fitted within the chamber of said hub, and constructed and arranged to be moved outward or inward to diminish or increase the tension of said spring by turning said screw pivot-pin, substantially as described.

2. A pair of shear-blades one of which is provided with a chambered hub having a slot or groove cut in its wall, in combination with a spring inclosed in said chambered hub, a nut provided with a radial projection to fit said slot or groove, and constructed and arranged to be moved outward or inward within the chamber of said hub, and a screw pivot-pin passing through both blades and the nut, all arranged and adapted to operate substantially as and for the purposes described.

In testimony whereof I have signed my name to this specification, in the presence of two subscribing witnesses, on this 15th day of October, A. D. 1885.

FRANK E. FRENCH.

Witnesses:
G. M. PICKENNY,
JAMES TRULAND.